though rather to illustrate the invention. All parts given are by weight unless otherwise noted.

United States Patent
Stockmann et al.

[15] 3,683,033
[45] Aug. 8, 1972

[54] NOVEL CYCLOALKYLATED PHENOL AND CYCLOALKYLATED PHENOL DERIVATIVES

[72] Inventors: Hans H. Stockmann, Plainfield; Eric A. Meier, New Brunswick, both of N.J.

[73] Assignee: National Starch and Chemical Corporation, New York, N.Y.

[22] Filed: May 14, 1969

[21] Appl. No.: 824,711

[52] U.S. Cl. ........260/619 D, 260/45.7 R, 260/45.85, 252/404, 252/52
[51] Int. Cl. ..............................................C07c 39/12
[58] Field of Search..................................260/619 D

[56] References Cited

UNITED STATES PATENTS

| | | |
|---|---|---|
| 1,917,823 | 7/1933 | Britton et al............260/619 D |
| 2,246,762 | 6/1941 | Schirm................260/619 D X |
| 2,553,470 | 5/1951 | Pines et al..........260/619 D X |
| 3,357,948 | 12/1967 | Stockmann et al..........260/619 D X |

OTHER PUBLICATIONS

Podberezina et al., " Chem. Abstracts" Vol. 66, p. 75729 (1966)

*Primary Examiner*—Leon Zitver
*Assistant Examiner*—Norman Morgenstern
*Attorney*—James and Franklin

[57] ABSTRACT

Novel cyclododecyl substituted phenols and a process for the preparation thereof are described; said compounds being useful as antioxidants for polymers, rubbers, oils, lubricants and the like.

3 Claims, No Drawings

NOVEL CYCLOALKYLATED PHENOL AND CYCLOALKYLATED PHENOL DERIVATIVES

BRIEF SUMMARY OF THE INVENTION

This invention relates to a novel class of cycloalkylated aromatic compounds. More particularly, the invention relates to phenols and their derivatives which are substituted with a cyclododecyl group at the 2 and 6, or at the 2, 4, and 6 positions of the phenyl ring. In a further aspect, this invention relates to a process for preparing the latter novel compounds.

The novel compounds of this invention correspond to the following general formula:

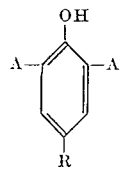

wherein A represents the cyclododecyl radical, and R is selected from the group consisting of the methyl and cyclododecyl radicals.

Thus, the novel compounds of this invention are seen to include 2, 4, 6-triscyclododecyl phenol and 2,6-dicyclododecyl-4-methyl phenol.

TECHNICAL DISCLOSURE OF THE INVENTION

The novel compounds of the present invention are obtainable as white crystalline solids having characteristic melting points. The compounds are appreciably soluble in many organic solvents such as benzene, toluene, cyclohexane, diethyl ether, and the like, and are only slightly soluble in water.

We have found that the novel cyclododecyl substituted phenols of the present invention are useful as antioxidants for substrates comprising hydrocarbons and substituted hydrocarbons such as natural and synthetic polymers, rubbers, oils, lubricants, and other compositions wherein it is desirable to inhibit thermal and oxidative degradation. Such degradation is manifested in the latter substrates by a marked deterioration in their appearance, physical properties, and performance.

The compounds of the present invention may function as primary antioxidants, i.e. they may be used as the sole antioxidant in a particular substrate or, preferably, they may be combined with a so-called secondary antioxidant which serves to enhance the stabilizing performance of the primary antioxidant. When used in combination with a secondary antioxidant, the stabilizing effect achieved is synergistic and the performance of the resulting combinations substantially exceeds the sum total of the performances exhibited by the individual antioxidant components thereof.

Secondary antioxidants suitable for use in combination with the novel compounds of this invention include dilaurylthiodipropionate; dicetyl sulfide; didodecyl sulfide; bis (tetradecylmercapto)-p-xylylene; bis (octadecylmercapto)-p-xylylene; xylylene; and compounds such as 19,25-dithiohentetracontane, 19,24-dithiotetracontane and other thiodipropionate esters such as distearylthiodi propionate, dioctadecylthiodipropionate, ditridecylthiodipropionate, dioctylthiodipropionate. It is contemplated that zinc salts of fatty and lower alkyl acids may also be used as secondary antioxidants in combination with the novel compounds of the invention. Exemplary of such zinc salts are zinc hexanoate, zinc 2-ethylhexanoate, zinc stearate and zinc propionate. The dodecyl substituted phenols may be employed in concentrations in the range from about 0.05 to 1.0 percent by weight of solid polymer or other substrate with the use of a concentration in the range of about 0.2 to 0.5 percent, by weight, being preferred.

Secondary antioxidants may be employed together with the novel compounds of this invention in the range of from about 0.1 to 1.0 percent, by weight, of the solid polymer or substrate with a concentration in the range of about 0.2 to 0.5 percent, by weight, being preferred. The above-described zinc salts may be employed with these novel antioxidants in the range from about 0.01 to 1.0 percent, by weight, of the solid polymer or substrate with a concentration in the range of about 0.02 to 0.1 percent, by weight, being preferred.

In practice, the antioxidant combinations can be intimately admixed with the selected substrate by any suitable means and at any stage prior to the final fabrication of the substrate which, in the case of polymeric substrates, would be at some point prior to, or simultaneous with, the milling thereof. Moreover, the novel antioxidants of our invention along with one or more secondary antioxidants may be added to the selected substrate either individually or as a combined system. They may be added in their natural physical form or, in order to achieve improved dispersion, they can be added in the form of an organic solvent solution.

The method used to prepare the novel cyclododecyl substituted phenols of this invention may be described generally as follows. Thus, a phenolic reagent, selected from the group consisting of phenol, i.e. hydroxybenzene, and 4-methyl phenol, is first dissolved in cyclododecene whereupon an acidic catalyst such, for example, as sulfuric acid, phosphoric acid, aluminum chloride, boron trifluoroetherate, and the like, is added to the system in order to initiate the reaction. About 2 or 3 moles of cyclododecene per each mole of the phenolic reagent is used depending upon whether it is desired to prepare the disubstituted or trisubstituted cyclododecyl reaction product. Ordinarily, a slight excess of about 5 to 7 percent of cyclododecene is used in order to insure its availability for a complete reaction with the phenolic reagent.

The initial reaction is exothermic and up to this point no external heat is applied to the mixture. However, when the initial exothermic reaction is completed, the mixture is then heated to a temperature of from about 110° to 160° C. for a period of from about 3 to 5 hours. Essentially, the reaction is continued for a period of time which is sufficient to complete the substitution of the cyclododecyl radical onto the aromatic ring. The reaction need not be conducted in a solvent system but such organic solvents as methylene chloride, benzene, chlorobenzenes, nitrobenzenes, alkylbenzenes, alkanes, chlorinated alkanes, and nitrated alkanes, etc. may be utilized in order to facilitate the reaction, if desired.

At the end of the reaction period, the resultant mass containing the crude product is cooled and dissolved in approximately an equal amount of an organic solvent, such, for example, as benzene, toluene, diethyl ether, hexane, carbon tetrachloride, and the like. The organic solution is then washed with portions of water followed by portions of dilute aqueous base such as sodium or potassium bicarbonate, sodium or potassium hydroxide, and the like. The organic solution is finally washed with water until the wash water is neutral to litmus. The washed organic solution is then dried using a drying agent such as sodium or magnesium sulfate, and the like, and concentrated, under reduced pressure, so as to yield a viscous mass. The resultant mass is crystallized from ethanol yielding the desired product as a white, crystalline solid. Further purification may be achieved by re-crystallization.

It should be noted that the phenolic reagent starting materials utilized in the process of this invention may also include derivatives of phenol and of 4-methyl phenol which contain substituent groups such, for example, as lower alkyl, halogeno, and the like, which are substituted on the 3 or on the 3 and 5 positions of the aromatic ring.

This invention will be described in greater detail in conjunction with the following specific examples in which all parts given are by weight unless otherwise indicated.

EXAMPLE I

This example illustrates the preparation of 2,4,6-tris-cyclododecyl phenol.

A reaction vessel fitted with a mechanical stirrer, thermometer, water-cooled condenser, and an injection port was charged with a solution of 18.8 parts of phenol dissolved in 140.0 parts of technical grade cyclododecene. At room temperature, 4 parts of boron trifluoride etherate was rapidly admixed with this solution while the latter was being subjected to mechanical agitation. After the initial exotherm had subsided, the reaction mass was heated to 120° C. and maintained at this temperature for 4 hours. At the conclusion of this period, the reaction mass was cooled to room temperature and then dissolved in 200 parts of benzene. The benzene solution was washed, in turn, with small portions comprising a total of 100 parts of water, 100 parts of an aqueous 5 percent sodium bicarbonate solution and, finally, with additional water until the wash water was neutral to litmus. The resultant benzene solution was then dried over anhydrous sodium sulfate and concentrated under reduced pressure so as to yield a viscous mass which was then crystallized from ethanol to yield a white crystalline solid. This solid was collected by filtration, dried, and recrystallized from ethanol to yield the purified product having a melting point of 153.5°-155.5° C.

The infra-red spectrum of the latter product possessed a sharp absorbtion band at 2.78 microns which was characteristic of di-orthoalkylated phenols.

EXAMPLE II

This example illustrates the preparation of 2,6-dicyclododecyl-4-methyl phenol.

A reaction vessel fitted with a mechanical stirrer, thermometer, water-cooled condenser, and an injection port was charged with a solution of 10.8 parts of p-cresol dissolved in 37.2 parts of cyclododecene. At room temperature, 1 part of boron trifluoride etherate was rapidly admixed with this solution while the latter was being subjected to mechanical agitation. After the initial exotherm had subsided, the reaction mass was heated to 150° C. and maintained at this temperature for 4 hours. At the conclusion of this period, the reaction mass was cooled to room temperature and then dissolved in 50 parts of benzene. The benzene solution was washed, in turn, with small portions comprising a total of 25 parts of water, 25 parts of an aqueous 5 percent sodium bicarbonate solution and, finally, with additional water until the wash water was neutral to litmus. The resultant benzene solution was then dried over anhydrous sodium sulfate and concentrated under reduced pressure so as to yield a viscous mass which was then crystallized from acetone to yield a white crystalline solid. This solid was collected by filtration, dried, and recrystallized from acetone to yield the purified product having a melting point of 129°-131° C.

The infra-red spectrum of the latter product possessed a sharp absorbtion band at 2.78 microns which was characteristic of di-orthoalkylated phenols.

EXAMPLE III

This example illustrates the use of 2,4,6-tris-cyclododecyl phenol in antioxidant systems for the stabilization of polypropylene.

A stabilizer combination which comprised 0.3 parts of 2,4,6-tris-cyclododecyl phenol, prepared as described in Example I, hereinabove, and 0.3 parts of dilaurylthiodipropionate was dissolved in 45 parts of methylene chloride. The resulting antioxidant solution was added to 100 parts of unstabilized polypropylene pellets and thoroughly blended therewith for a period of 15 minutes. The resulting polypropylene mix was then milled for 5 minutes on a roller mill maintained at a temperature of 370° F., so as to result in the preparation of a plastic, homogeneous mass.

Plastic sheets, 25 mils in thickness, were then prepared by pressing the latter plastic mass between two polished aluminum plates which were maintained at a temperature of 350° F. Upon cooling, the plastic sheets were cut into 2-inch squares which were exposed to a degradative atmosphere for a period of 48 hours by being suspended, by means of stainless steel clips, in a thermostatically controlled, forced-air oven which was set at a temperature of 300° F.

The polypropylene sheets resulting from the above-described procedure were then compared with unstabilized polypropylene sheets, with polypropylene sheets which had been prepared as as to contain 0.3 parts of dilaurylthiodipropionate intimately mixed therein, as well as with polypropylene sheets which had been prepared so as to contain 0.3 parts of 2,4,6-tris-cyclododecyl phenol intimately admixed therein. All of the thus produced sheets had a thickness of 25 mils and had been prepared and tested in a manner similar to that used for the stabilized sheets described hereinabove. In each instance, four specimens of each plastic sheet were evaluated in order to check the reproducibility of the test procedure.

The results of these determinations revealed that those polypropylene sheets which had been prepared so as to contain a blend of 2,4,6-tris-cyclododecyl phenol and dilaurylthiodipropionate exhibited significantly less crazing than the sheets which contained only the 2,4,6,cyclododecyl phenol. The latter samples were, however, far less degraded than the sheets which contained only the dilaurylthiodipropionate as a stabilizer while they offered a rather substantial reduction in degradation when compared with the controls which did not contain any stabilizer.

The results described above clearly indicate the excellent antioxidative protection afforded by the cyclododecyl substituted phenols of this invention either when used alone or in combination with a secondary antioxidant such as dilaurylthiodipropionate.

EXAMPLE IV

This example illustrates the combination of 2,6-di-cyclododecyl-4-methyl phenol with various secondary antioxidants with the resulting blends being used to stabilize a number of different substrates.

Antioxidant combinations of 2,6-di-cyclododecyl-4-methyl phenol and secondary antioxidants listed hereinbelow were prepared by means of the procedure described, hereinabove, in Example III.
  a. 2,6-di-cyclododecyl-4-methyl phenol (0.2 parts) and dilaurylthiodipropionate (0.2 parts)
  b. 2,6-di-cyclododecyl-4-methyl phenol (0.4 parts) and dicetyl sulfide (0.4 parts)
  c. 2,6-di-cyclododecyl-4-methyl phenol (0.2 parts) and dioctadecylthiodipropionate (0.2 parts)
  d. 2,6-di-cyclododecyl-4-methyl phenol (0.2 parts) and zinc stearate (0.1 parts)

Each of the latter antioxidant combinations were, in turn, blended with samples of polypropylene, rubber, and lubricating oil with the resulting blends displaying excellent stability in all instances.

Summarizing, our invention is thus seen to provide novel compounds useful as antioxidants which inhibit the degradation of such substrates as polymers, rubbers, oils, and lubricants, these novel compounds being capable of successful use either alone or in combination with a secondary antioxidant. Variations may be made in proportions, procedures, and materials without departing from the scope of this invention as defined by the following claims.

We claim:

1. A compound of the formula:

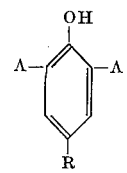

wherein A represents the cyclododecyl radical and R is selected from the group consisting of the methyl and cyclododecyl radicals.

2. The formula of claim 1 in which the compound is 2,4,6-Tris-cyclododecyl phenol.

3. The formula of claim 1 in which the compound is 2,6-Di-cyclododecyl-4-methyl phenol.

* * * * *